(12) United States Patent
Ljungblad

(10) Patent No.: US 7,075,693 B2
(45) Date of Patent: Jul. 11, 2006

(54) ADDRESSING METHOD OF MOVABLE ELEMENTS IN A SPATIAL LIGHT MODULATOR (SLM)

(75) Inventor: Ulric Ljungblad, Molndal (SE)

(73) Assignee: Micronic Laser Systems AB, Taby (SE)

( * ) Notice: Subject to any disclaimer, the term of this patent is extended or adjusted under 35 U.S.C. 154(b) by 98 days.

(21) Appl. No.: 10/507,554

(22) PCT Filed: Mar. 14, 2003

(86) PCT No.: PCT/SE03/00427

§ 371 (c)(1),
(2), (4) Date: Sep. 14, 2004

(87) PCT Pub. No.: WO03/079090

PCT Pub. Date: Sep. 25, 2003

(65) Prior Publication Data

US 2005/0122558 A1 Jun. 9, 2005

(30) Foreign Application Priority Data

Mar. 15, 2002 (SE) .................................... 0200787

(51) Int. Cl.
G02F 1/00 (2006.01)
G02B 26/00 (2006.01)

(52) U.S. Cl. ........................ 359/237; 359/298

(58) Field of Classification Search ................. 359/237
See application file for complete search history.

(56) References Cited

U.S. PATENT DOCUMENTS

| 5,032,924 A * | 7/1991 | Brown et al. ................ 348/759 |
| 5,382,961 A | 1/1995 | Gale, Jr. |
| 5,771,116 A | 6/1998 | Miller et al. |
| 6,044,705 A | 4/2000 | Neukermans et al. |
| 2001/0015750 A1 | 8/2001 | Enomoto et al. |

FOREIGN PATENT DOCUMENTS

EP 0 637 042 A2 2/1995

\* cited by examiner

*Primary Examiner*—Scott J. Sugarman
*Assistant Examiner*—Richard Hanig
(74) *Attorney, Agent, or Firm*—Ernest J. Beffel, Jr.; Haynes Beffel & Wolfeld LLP

(57) ABSTRACT

The present invention relates to a method for modulating at least one pulse of electromagnetic radiation with a spatial light modulator. At least one mechanically movable modulator element is provided. At least one actuating element is provided capable to produce forces on said modulator element. An address signal to said at least one movable element is provided. A first amplifying signal is provided to at least one first electrode belonging to said at least one movable element shaping and timing said amplifying signal for creating a mechanical response in the modulator element representing a desired modulation state for said electromagnetic radiation pulse when impinging onto said modulator element.

117 Claims, 8 Drawing Sheets

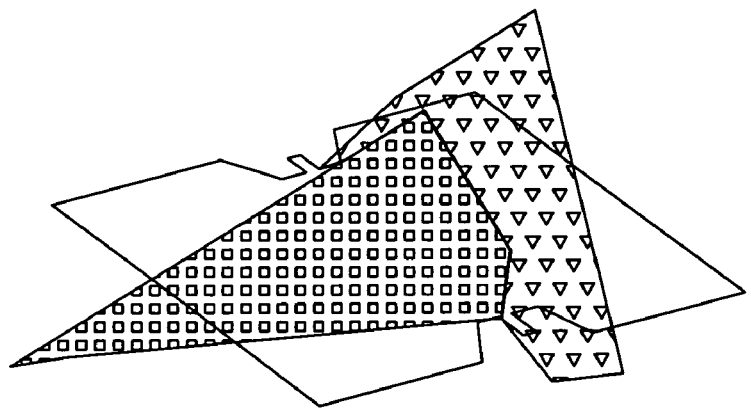
Fig. 8c       800
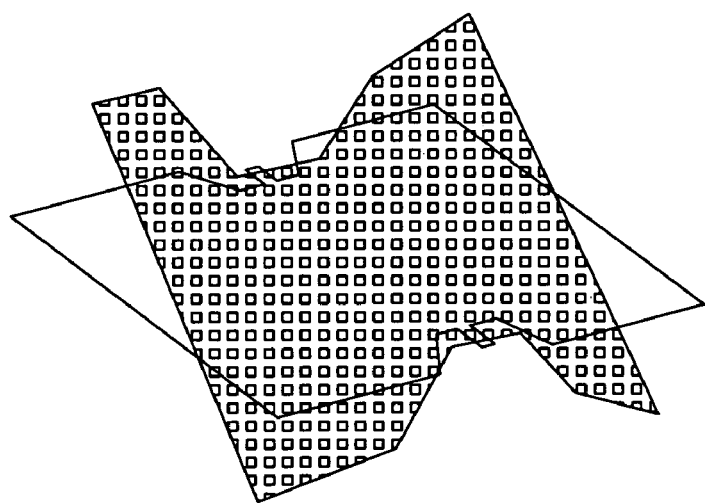
Fig. 8d       800

ADDRESSING METHOD OF MOVABLE ELEMENTS IN A SPATIAL LIGHT MODULATOR (SLM)

PRIORITY DATA

This application is the National Stage of International Application No. PCT/SE03/00427, filed 14 Mar. 2003; which application claims the benefit of Swedish Application No. 0200787-0, filed 15 Mar. 2002.

TECHNICAL FIELD

The invention relates to an addressing method of microelements, more particularly, to an addressing method of movable elements in a Spatial Light Modulator (SLM).

BACKGROUND OF THE INVENTION

Micro-electromechanical systems (MEMS) may comprise movable micro-mirrors fabricated by microelectronic processing techniques on wafer substrates. Electrostatic actuation is most commonly used to deflect micro-mirrors. In order to produce a force, a voltage is generated between two electrodes, one of which is stationary and the other of which is attached to an actuator for example the movable micro-mirror.

An SLM with an array of actuators used in for example a mask writing tool or a chip manufacturing tool is loaded with a specific pattern, where each actuator is in an addressed state or a non-addressed state before each stamp is printed. This pattern may be a subset of the pattern to be printed on the mask or chip respectively. Each actuator mirror is deflected electrostatically by applying voltage between the mirror and an underlying address electrode, after which the actuator mirror is allowed to move into its predetermined deflected state before an electromagnetic radiation source is triggered to print the stamp.

A deflection amplitude of the actuator mirror in a spatial light modulator (SLM) is determined by a number of factors such an addressing voltage, mirror hinge material stiffness, mirror hinge thickness, electrode to mirror distance etc. With otherwise optimized parameters the addressing voltage is usually the determining free parameter for being able to reach the maximum required mirror deflection amplitude. This, in turn, sets the requirements for a voltage span of an addressing CMOS circuit. As a mirror area needs to shrink for future generations of SLM components to allow more mirrors per SLM chip, the addressing voltage will need to increase dramatically for otherwise unchanged parameters. A size of a pixel cell in the CMOS circuit is strongly dependent on the voltage span of the addressing CMOS circuit, why for smaller mirror sizes, with increased addressing voltage span, the CMOS circuit becomes the limiting factor for future actuator sizes.

SUMMARY OF THE INVENTION

Accordingly, it is an object of the present invention to provide a method of addressing microelements, which overcomes or at least reduces the above-mentioned problem of increased address voltages for smaller actuator sizes.

This object, among others, is according to a first aspect of the invention attained by a method for modulating at least one pulse of electromagnetic radiation with a spatial light modulator. At least one mechanically movable modulator element is provided. At least one actuating element capable to produce forces on said modulator element is provided. An address signal is provided to said at least one movable element. A first amplifying signal is provided to at least one first electrode belonging to said at least one movable element. Said amplifying signal is shaped and timed for creating a mechanical response in the modulator element representing a desired modulation state for said electromagnetic radiation pulse when impinging onto said modulator element.

In another inventive embodiment said amplifying signal is an undulating waveform exciting a resonant mechanical response.

In still another inventive embodiment said amplifying signal is a pulse exciting a transient mechanical response.

In yet another inventive embodiment said undulating signal is sine shaped.

In yet another inventive embodiment said undulating signal is saw tooth shaped.

In yet another inventive embodiment said undulating signal is square wave shaped.

In still another inventive embodiment said pulse lasts shorter than the time it takes for the movable element to reach its maximum deflection thereby avoiding a snap-in state.

In still another inventive embodiment said undulating signal is timed to generate a maximum in the mechanical response of the movable modulator element at the time of impinging the electromagnetic signal onto the modulator.

In still another inventive embodiment an amplifying signal is provided to at least one second electrode, cooperating with said at least one first electrode.

In still another inventive embodiment said addressing is done in a first phase and said amplifying signal is provided in a second phase.

In still another inventive embodiment said mechanical response of the movable element is actively damped to rest after said electromagnetic radiation has impinged onto said modulator.

In still another inventive embodiment said actuating element is a gap.

In still another inventive embodiment said actuating element is a dielectric medium.

In still another inventive embodiment said dielectric medium is elastic.

In still another inventive embodiment said actuating element is a piezoelectric medium.

In still another inventive embodiment, said actuating element is an electrostrictive medium.

In still another inventive embodiment, said modulator element is damped by fluid forces.

In still another inventive embodiment said modulator element is damped by mechanical losses in a solid material.

In still another inventive embodiment, said modulator element is damped by resistive damping.

In still another inventive embodiment, said modulator element is damped by magnetically induced eddy currents.

In still another inventive embodiment a signal is applied, which counteracts an induced mechanical resonance actively by damping.

In still another inventive embodiment said amplifying signals provided on said at least one first and said at least one second electrodes are undulating signals 180 degrees out of phase relative to each other.

In still another inventive embodiment said movable element is a digital element.

In still another inventive embodiment said movable element is a multivalued element.

In still another inventive embodiment said movable element has a tilting action.

In still another inventive embodiment said movable element has a piston action.

In still another inventive embodiment said movable element modulates the intensity of said electromagnetic radiation.

In still another inventive embodiment said movable element modulates the phase of said electromagnetic radiation.

The invention also relates to a method for modulating at least one pulse of electromagnetic radiation with a spatial light modulator (SLM). At least one mechanically movable modulator element is provided. At least one actuating element capable to produce forces on said modulator element is provided. An address signal is provided to at least one electrode belonging to said at least one mechanically movable modulator element. An amplifying signal is provided to said at least one modulator element. Said amplifying signal is shaped and timed for creating a mechanical response in the modulator element representing a desired modulation state for said electromagnetic radiation pulse when impinging onto said modulator element.

In another inventive embodiment said amplifying signal is an undulating waveform exciting a resonant mechanical response.

In another inventive embodiment said amplifying signal is a pulse exciting a transient mechanical response.

In another inventive embodiment said undulating signal is sine shaped.

In another inventive embodiment said undulating signal is saw tooth shaped.

In another inventive embodiment said undulating signal is square wave shaped.

In another inventive embodiment said pulse lasts shorter than the time it takes for the movable element to reach its maximum deflection thereby avoiding a snap-in state.

In another inventive embodiment said undulating signal is timed to have a maximum in the mechanical response in deflection of the movable element at the time of impinging the electromagnetic signal onto the modulator.

In another inventive embodiment said addressing is done in a first phase and said amplifying signal is provided in a second phase.

In another inventive embodiment the mechanical response of the movable element is actively damped to rest after said electromagnetic radiation has impinged onto said modulator.

In another inventive embodiment said actuating element is a gap, comprising any kind of gaseous media.

In another inventive embodiment said actuating element is a dielectric medium.

In another inventive embodiment said dielectric medium is elastic.

In another inventive embodiment said actuating element is a piezoelectric medium.

In another inventive embodiment said actuating element is an electrostrictive medium.

In another inventive embodiment said modulator element is damped by the ambient gas.

In another inventive embodiment said modulator element is damped by fluid forces.

In another inventive embodiment said modulator element is damped by mechanical losses in a solid material.

In another inventive embodiment said modulator element is damped by resistive damping.

In another inventive embodiment said modulator element is damped by magnetically induced eddy currents.

In another inventive embodiment a signal is applied, which counteracts an induced mechanical resonance actively by damping.

In another inventive embodiment said movable element is a digital element.

In another inventive embodiment said movable element is a multivalued element.

In another inventive embodiment said movable element has a tilting action.

In another inventive embodiment said movable element has a piston action.

In another inventive embodiment said movable element modulates the intensity of said electromagnetic radiation.

In another inventive said movable element modulates the phase of said electromagnetic radiation.

The invention also relates to a method for modulating at least one pulse of electromagnetic radiation with a spatial light modulator. At least one mechanically movable modulator element is provided. At least one actuating element capable to produce forces on said modulator element is provided. A first address signal is provided to at least one first electrode belonging to said movable element. A first amplifying signal is providing to the at least one first electrode belonging to said at least one movable element. Said amplifying signal is shaped and timed for creating a mechanical response in the modulator element representing a desired modulation state for said electromagnetic radiation pulse when impinging onto said modulator element.

In another inventive embodiment said amplifying signal is an undulating waveform exciting a resonant mechanical response.

In yet another inventive embodiment said amplifying signal is a pulse exciting a transient mechanical response.

In still another inventive embodiment said undulating signal is sine shaped.

In still another inventive embodiment said undulating signal is saw tooth shaped.

In still another inventive embodiment said undulating signal is square wave shaped.

In still another inventive embodiment said pulse lasts shorter than the time it takes for the movable element to reach its maximum deflection thereby avoiding a snap-in state.

In still another inventive embodiment said undulating signal is timed to have a maximum in the mechanical response at the time of impinging the electromagnetic signal onto the modulator.

In still another inventive embodiment a second amplifying signal and/or a second address signal are provided to at least one second electrode, cooperating with said at least one first electrode.

In another inventive embodiment said addressing is done in a first phase and said amplifying signal is provided in a second phase.

In still another inventive embodiment said mechanical response of the movable element is actively damped to rest after said electromagnetic radiation has impinged onto said modulator.

In still another inventive embodiment said actuating element is a gap comprising any kind of gaseous media.

In still another inventive embodiment said actuating element is a dielectric medium.

In still another inventive embodiment said dielectric medium is elastic.

In still another inventive embodiment said actuating element is a piezoelectric medium.

In still another inventive embodiment said actuating element is an electrostrictive medium.

In still another inventive embodiment said modulator element is damped by the ambient gas.

In still another inventive embodiment said modulator element is damped by fluid forces.

In still another inventive embodiment said modulator element is damped by mechanical losses in a solid material.

In still another inventive embodiment said modulator element is damped by resistive damping.

In still another inventive embodiment said modulator element is damped by magnetically induced eddy currents.

In still another inventive embodiment a signal is applied, which counteracts an induced mechanical resonance actively by damping.

In still another inventive embodiment said amplifying signals provided on said at least one first and said at least one second electrodes are undulating signals 180 degrees out of phase relative to each other.

In still another inventive embodiment said movable element is a digital element.

In still another inventive embodiment said movable element is a multivalued element.

In still another inventive embodiment said movable element has a tilting action.

In still another inventive embodiment said movable element has a piston action.

In still another inventive embodiment said movable element modulates the intensity of said electromagnetic radiation.

In still another inventive embodiment said movable element modulates the phase of said electromagnetic radiation.

In still another inventive embodiment said amplifying signal and said address signal belong to the same signal.

The invention also relates to a method for patterning a workpiece arranged at an image plane and covered at least partly with a layer sensitive to electromagnetic radiation, by using at least one spatial light modulator (SLM) arranged at an object plane, where said SLM comprises at least one modulator microelement, an address signal is provided to said at least one modulator microelement. Said at least one modulator microelement is deflected to a desired degree of deflection by providing a first amplifying signal to at least one first electrode belonging to said at least one modulator microelement. Electromagnetic radiation is emitted and directed onto said object plane. Said emitting of the electromagnetic radiation is synchronized with said desired degree of deflection of said at least one actuator microelement. Said electromagnetic radiation is received by said spatial light modulator. A modulated electromagnetic radiation is relayed by said spatial light modulator toward said work piece.

In another inventive embodiment said synchronization is performed so that said electromagnetic radiation impinges on at least one modulator microelement at its maximum oscillating amplitude being said desired degree of deflection.

In still another inventive embodiment said synchronization is performed so that said electromagnetic radiation impinges on at least one modulator microelement at a predetermined deflection state before it reaches its maximum amplitude.

The invention also relates to a method for patterning a workpiece arranged at an image plane and covered at least partly with a layer sensitive to electromagnetic radiation, by using at least one spatial light modulator (SLM) arranged at an object plane, where said SLM comprises at least one modulator microelement. an address signal is provided to at least one electrode belonging to said at least one modulator microelement. Said at least one modulator microelement is deflecting to a desired degree of deflection by providing a first amplifying signal to said at least one modulator element. electromagnetic radiation is emitted and directed onto said object plane. Said emitting of the electromagnetic radiation is synchronized with said desired degree of deflection of said at least one actuator microelement. said electromagnetic radiation is received by said spatial light modulator. A modulated electromagnetic radiation is relayed by said spatial light modulator toward said work piece.

In another inventive embodiment said synchronization is performed so that said electromagnetic radiation impinges on at least one modulator microelement at its maximum oscillating amplitude being said desired degree of deflection.

In still another inventive embodiment said synchronization is performed so that said electromagnetic radiation impinges on at least one modulator microelement at a predetermined deflection state before it reaches its maximum amplitude.

The invention also relates to a method for patterning a workpiece arranged at an image plane and covered at least partly with a layer sensitive to electromagnetic radiation, by using at least one spatial light modulator (SLM) arranged at an object plane, where said SLM comprises at least one modulator microelement. An address signal is provided to at least one electrode belonging to said at least one modulator microelement. Said at least one modulator microelement is deflected to a desired degree of deflection by providing a first amplifying signal to at least one electrode emitted and directed onto said object plane. Said emitting of the electromagnetic radiation is synchronized with said desired degree of deflection of said at least one actuator microelement. Said electromagnetic radiation is received by said spatial light modulator. A modulated electromagnetic radiation is relayed by said spatial light modulator toward said work piece.

In another inventive embodiment said synchronization is performed so that said electromagnetic radiation impinges on at least one modulator microelement at its maximum oscillating amplitude being said desired degree of deflection.

In another inventive embodiment said synchronization is performed so that said electromagnetic radiation impinges on at least one modulator microelement at a predetermined deflection state before it reaches its maximum amplitude.

Further characteristics of the invention, and advantages thereof, will be evident from the detailed description of preferred embodiments of the present invention given hereinafter and the accompanying FIGS. 1–4b, which are given by way of illustration only, and thus are not limitative of the present invention.

BRIEF DESCRIPTION OF THE DRAWINGS

FIG. 4b illustrates the applied signal (potential) versus time for the oscillation according to FIG. 4a.

FIGS. 8a–8d illustrates the mechanical behavior of a micro mirror element for different orders of resonance frequencies.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Further, the preferred embodiment is described with reference to a deflectable electrostatic driven micro-mirror. It will be obvious to one ordinary skill in the art that actuators other than deflectable and electrostatic driven micromirrors will be equally applicable; examples are piezoelectric actuators, electrostrictive actuators, piston like actuators of circular or polygonal shape or similar devices. Actuating material may be a gap of air, gas, vacuum, viscous, electrostrictive, viscoelastic or elastic material. It may also be a combination of any of the medias above. The movement of the actuator element may be tilting or translational.

Figure 1:
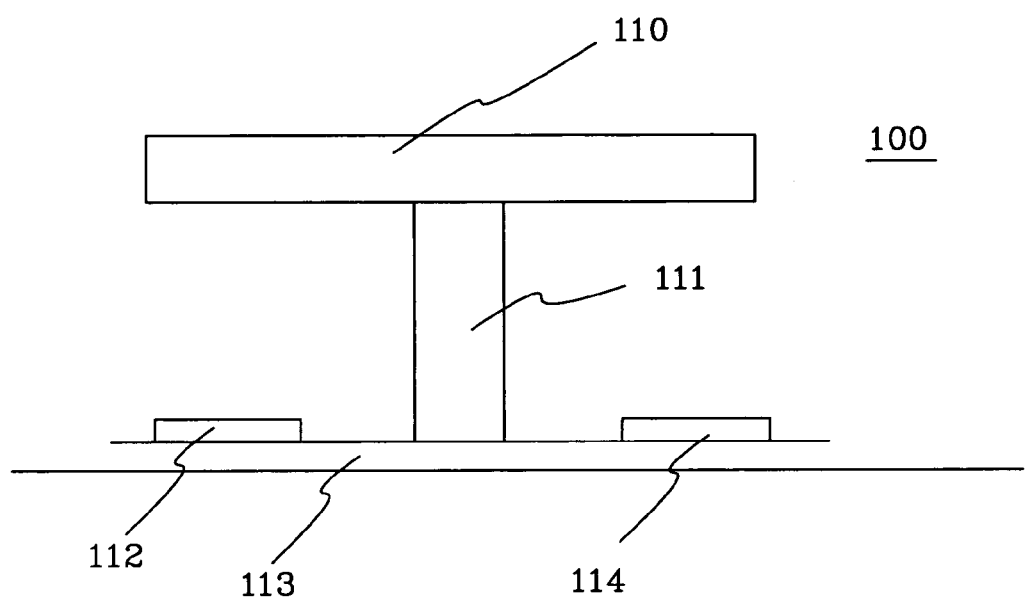
FIG. 1 illustrates schematically a side view of an actuator structure in an unaddressed state.

FIG. 1 illustrates schematically a side view of a state of the art actuator structure 100. The structure 100 is depicted in an unaddressed state. Such an actuator structure 100 may for instance be a micro-mirror structure in a spatial light modulator (SLM). The actuator structure, depicted in FIG. 1, comprises a substrate 113, a first electrode 112 and a second electrode 114, a support structure 111 and a movable element 110. Said substrate may be made of semiconducting material and may comprise one or a plurality of CMOS circuits. The first and second electrodes are made of an electrically conductive material, such as gold, copper, silver or alloys of said and/or other electrically conductive materials. Said electrodes are connectable to steering circuits, such as the above mentions CMOS circuit.

The support structure 111 is preferably manufactured of a relatively stiff material, such as single crystal silicon, but may of course be made of materials not having pronounced high stiffness. The movable element 110 is preferably manufactured of a material having good optical properties, such as aluminum. However, if a material is selected not having the characteristics as desired, said material may be coated with one or a plurality of layers of other materials having more favorable characteristics, thereby creating a sandwich structure.

An electrostatic force may deflect the movable element 110. Applying different potentials on the movable element 110 and one of the first 112 and second 113 electrodes creates electrostatic force. In the event of applying a first potential on the movable element 110 and a second potential on said first and second electrodes, where said first and second potentials are different, creates an electrostatic force, but will not deflect said movable element. The reason for this is that the attractive force, which force is always attractive independently of the polarity of the potential difference, between the first electrode and the mirror is equivalent to the attractive force between the second potential and the same mirror. The two equal attractive forces equalize each other, except of a possible bending of the movable element which is normally very small and can therefore be neglected.

In FIG. 1 the actuator structure is illustrated to comprise two electrodes, the first 112 and second 113 electrodes. However, deflecting the movable element requires only one electrode, either the first 112 or second 113 one. There may be several reasons for having more than one electrode. One such reason is that it takes two electrodes arranged spaced apart from each other to deflect the mirror in two different directions. Other reasons become apparent from the description herein below describing different embodiments of the inventive method.

Figure 2:
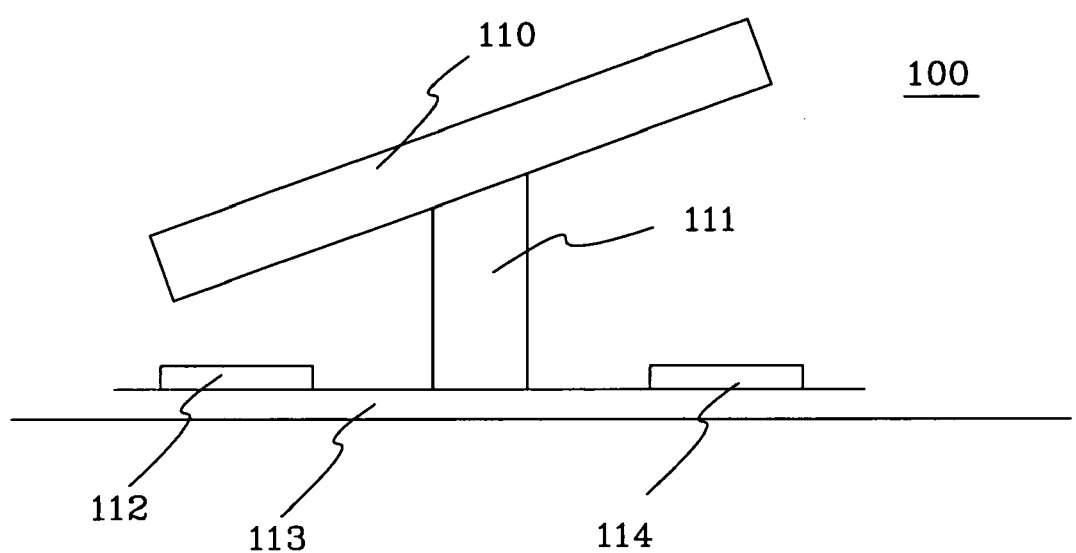
FIG. 2 illustrates schematically a side view of the actuator structure in an addressed state.

FIG. 2 depicts the actuator structure 100 in an addressed state. The actuator structure 100 may be digital, i.e., on-off, or multivalued, i.e., having a plurality of states larger than two.

In a first inventive embodiment, for reducing a required potential difference between the movable element 110 and the electrode 112, 114 for a given deflection, one of the first and second electrodes is constantly set to ground potential, the other electrode is set to a variable DC potential and the movable element is set to an AC potential. Alternatively, with a single electrode, said single electrode is set to said DC potential and the movable element to said AC potential.

The frequency of the AC potential is chosen to coincide with the mechanical response resonance frequency of a deflecting action of the movable element. The resonance frequency for a micro-mirror structure in a spatial light modulator is inter alia determined by the material chosen for the support element 111 and hinge for said mirror. It is also determined by a cross sectional area of the support structure and hinge and the weight of the movable element. We are here talking about the mechanical response resonance frequency of the movable element, not the undesired resonance within the movable element, such as a resonance of curvature of a movable element, which will make the surface of the movable element, such as a micromirror, out-off-flat. The mechanical resonance frequency is typically between 500 kHz and 1 MHz, i.e., a first order resonance frequency, for an SLM micro-mirror having a rectangular shape with sides being 16 µm. The amplitude of said AC potential may be set to a desired voltage span, but may typically be ±5V.

Figure 4A:
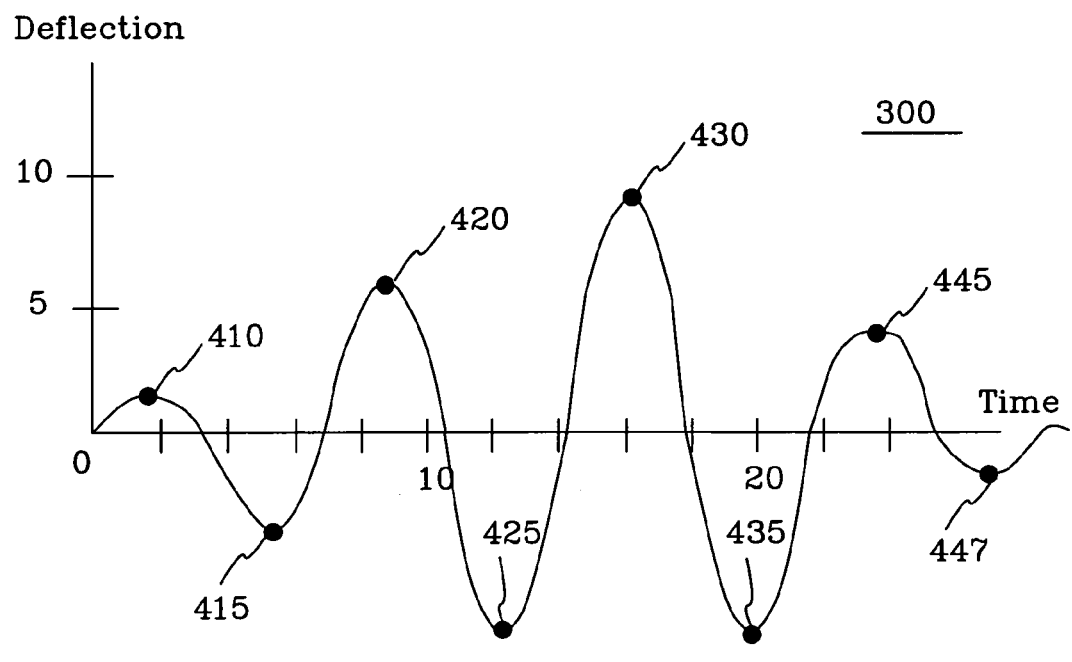
FIG. 4a is a schematic illustration of a deflection versus time curve for a movable microelement when said element is brought to oscillate according to the invention.
Figure 4B:
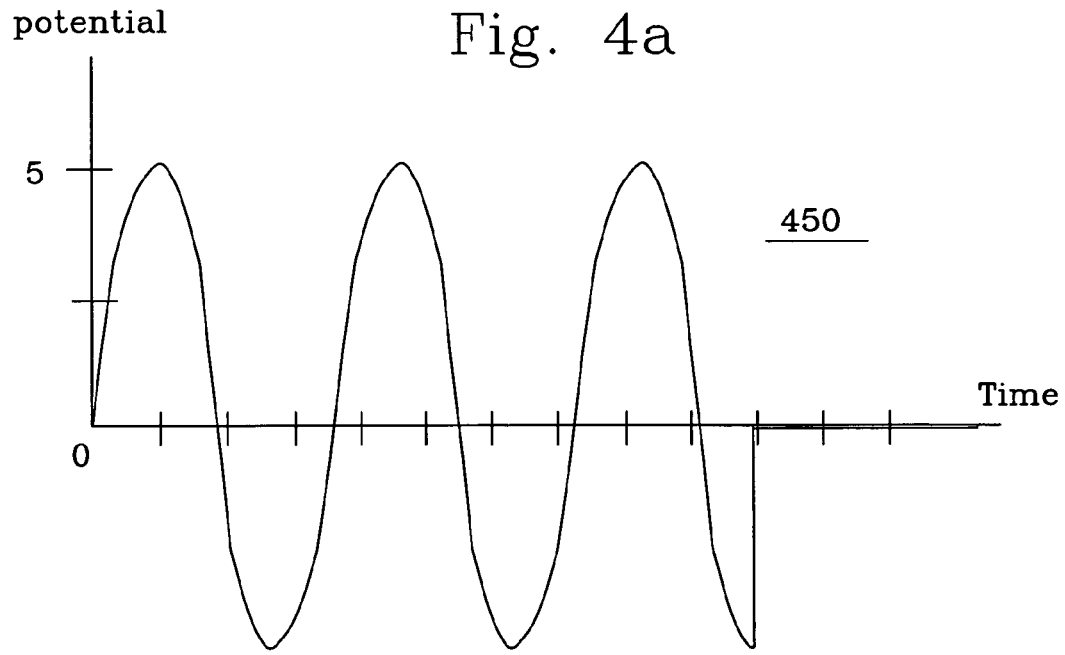

FIG. 4a illustrates schematically an oscillation curve 400 for a movable element when applying a signal 450 as illustrated in FIG. 4b, where the frequency of the depicted signal 450 in FIG. 4b is assumed to coincide with the deflecting mechanical resonance frequency of the movable element, i.e., not the resonance of curvature within the movable element which will make the surface of the movable element out-of-flat. At time 0 the signal is applied and the movable element 110 is starting to oscillate. After a number of periods, in this case 3, the maximum amplitude 430 of the oscillation is reached. After having reached the maximum amplitude the applied signal is released, in this case it is released when the movable element is at its minimum deflection point 435. The maximum deflection can be theoretically or practically determined. This is also applicable to the minimum deflection and all deflection states in between minimum and maximum. Therefore, a pulse of electromagnetic radiation can be synchronized to impinge on the movable element at any state in between maximum or minimum or at said maximum or minimum state. Preferably said pulse of electromagnetic radiation is synchronized to impinge on said movable element at any of the local maximum or minimum states or at said minimum or maximum state, since for a given time interval, in the order of nanoseconds, the change in deflection is lesser at a maximum or minimum point compared to a point elsewhere on the deflection versus time curve. By synchronizing at maximum or minimum points the accuracy may be increased.

In FIG. 4b said applied signal is illustrated to be sine-like, however any signal capable to create a mechanical resonance in the movable element is equally applicable.

The attractive force between the electrode 112, 114 and the movable element 110 is proportional to the square of the difference in potential between said electrode and said element. When the potential on the movable element 110 is alternating between a max and a min amplitude value in a sinusoidal fashion, and the first and second electrodes 112, 114 or the single electrode is kept at ground potential, the movable element 110 is not deflected, because a frequency of the attractive force is not coinciding with the mechanical resonance frequency as will be described in more detail below. The force is, as described above, $\sin^2\omega$, where $\omega$ is the $2\pi f$ and where f is the frequency of the AC potential. Said frequency f is set to coincide with the mechanical resonance frequency $f_R$ of the actuator structure.

When the potential on said single electrode or one of said first and second electrodes 112, 114 is changed from ground potential to a positive or negative potential, said movable element 110 will deflect. Since $\sin^2\omega$ is equivalent to $\frac{1}{2} - \frac{1}{2}*(\cos 2\omega)$, one can immediately see that the force between said movable element 110 and said electrode(s) is not a pure cosine waveform and that the frequency for the force is twice the resonance frequency $\omega$ for electrode(s) at ground potential. An attractive force for potentials on said electrode(s) different from ground potential will be $(x+\sin \omega)^2 = x^2 + 2*x*\sin \omega + \sin^2\omega = \frac{1}{2} + x^2 + 2*x*\sin \omega - \frac{1}{2}*(\cos 2\omega)$, where x is the contribution from the DC potential on said electrode and $\sin \omega$ is the contribution from the AC potential on said movable element. By setting x to 0, said attractive force expression would transform into the above mention expression for electrodes having ground potential.

Since there is a contribution from the mechanical resonance frequency $\omega$ in the term $2*x*\sin \omega$ indicates that the force is amplified. For increasing absolute value of the potential on said electrode different from said ground potential said amplification would increase. Comparing the expression for electrodes having ground potential and electrodes having potential different from ground potential one can see that there is a shift in mechanical energy into the resonance frequency, which would lead to an amplification of the deflection. Compared to state of the art electrostatic attraction of movable elements, where the deflection is given by the potential difference between the movable element and the electrode only, there is also a term of mechanical gear when setting the mirror potential to resonance frequency $\omega$, given that the electrode potential is different from ground potential. The mechanical gear is determined by the Q-value of the actuator structure.

The inventive method for addressing actuators in an SLM, where the actuators are micro-mirror structures arranged in an array, may well be used in a pattern generator utilizing an SLM for patterning a workpiece. The array may comprise several million micro-mirror structures. A state of the art pattern generator for patterning a workpiece using lithography may make use of a pulsed laser source for imaging the pattern on the SLM onto a workpiece. Said stamps of the SLM on said workpiece may constitute only a fraction of the complete pattern to be imaged. Between laser flashes a new pattern description is loaded into the SLM, i.e. individual micromirrors are set to new deflection states by applying a different set of potential differences between the mirror elements and an underlying electrodes.

By synchronizing the resonance frequency of said actuator structure and a pulse rate of said laser source, a predictive pattern of the SLM can be imaged onto a workpiece. A laser may be flashed when the oscillating mirror has reached its maximum deflected state, indicated by 430 in FIG. 4a, which will require a number of oscillating periods depending mainly on the Q-value of the actuator structure. However, as the Q-factor can be determined for a given actuator structure one may synchronize to flash the laser for any amplitude value between a maximum amplitude and a minimum amplitude, for example local maximum points 410, 420 or local minimum points 415, 425. It is also possible to synchronize the flash of the laser with the local maximum point 445 or local minimum point in the damped region of the mechanical response curve 400. Preferably, all movable elements in a SLM chip are set to the same AC frequency with the same maximum and minimum amplitude values. However, there is also possible to set individual movable elements to individual maximum and minimum amplitude values and/or individual AC frequency.

The time, i.e., number of periods, it takes for a movable element to come to rest is determined, inter alia, by mechanical losses, ambient material such as any kind of gas including but not limited to air, an inert gas or any type of gas which will improve the behavior of the reflectivity of the movable element being a micromirror, ambient field, e.g., magnetic or electric etc. However by active cushioning of the resonant frequency said time may be reduced more or less radically. Applying a counter AC voltage to the micromirror or at least one electrode out of phase to the one used for amplifying the movement of the movable element may perform active cushioning or damping. Applying a magnetic filed around the movable element may also perform damping.

The cushioning may be enhanced by actively calibrating the required function of the amplitude used for said cushioning. The resonance frequency may be adjusted actively. The actuator structure depicted in FIG. 1 may be seen as two coupled oscillating circuits, one mechanical and one electrical. The electrical oscillating circuit is defined by a first capacitive circuit between the actuator element and the electrode and an inherent capacitive circuit in steering electronics for said electrodes. Said inherent capacitive circuit may be adjusted actively, thereby trimming the resulting resonance frequency. This may be applied for each individual actuator element separately and independently of each other in an array of actuator elements, such as micromirror structures in an SLM.

The Q value determines the width of the amplifying region for an individual actuator structure. A high Q value results in a narrow frequency window with a relatively high amplification factor whereas a low Q value result in a broad frequency window with a relatively low amplification factor. Said frequency window should comprise a part which is overlapping for each actuator structure, i.e. by choosing an appropriate design of the actuator element one can optimize the amplification factor given that all actuator element possess an amplification for a given frequency. If a too high amplification is chosen, the width of the frequency window may be too narrow, resulting in non-overlapping amplification regions for different actuator structures.

By driving the movement with a force, oscillating with a frequency in the range of the microelements resonant frequency, the amplitude of the movement will be amplified by the resonance amplification Q (quality of oscillator). Thus, for a desired amplitude of the movement the driving voltage can be reduced. The Q value is proportional to $A*m*(d^2x/dt^2)-B*(dx/dt)+C*x$, where A, B, C are constants, m is the mass of the movable element, $(d^2x/dt^2)$ is the acceleration of the movable element, (dx/dt) is the velocity of the movable element and x is the spring constant of hinges and support structures attached or attachable to the movable element. An ambient material such as its pressure, viscosity and temperature mainly determines the cushioning term, indicated by the minus sign the expression above.

In transient addressing as well, the gap can be significantly reduced without any risk of "snap-in" by inducing the movement with a force acting only a short time period, for example a time period less than quarter of a period of the microelement resonant oscillation.

The gap can also be reduced for resonant addressing since an acceleration of the movable element has changed direction when approaching the snap-in state.

In one example of transient addressing, the addressing voltage is applied to one electrode, while the other electrode and the movable element have equal potential. By applying the addressing voltage as a short pulse, the movement will continue after the voltage pulse due to inherent inertia. When the movement is at maximum amplitude, i.e. closest to the electrode, the potential difference between the electrode and the movable element is removed, hence the electric field and therefore the accelerating force is removed. Consequently no "snap-in" can possibly occur. Thus, the gap can be made only slightly larger than the maximum amplitude of the movement, and the applied voltage can therefore be significantly reduced for a specific addressing voltage.

In one embodiment of the invention said AC potential is constantly applied to said actuator element. In another embodiment of the invention only a fraction of said AC potential is used, i.e., a pulsed AC potential with a predetermined pulse length. It is also possible to use a plurality of signal spikes, since a spike comprises a variety of frequencies, inter alia the resonance frequency, an appropriate choice of spike frequency and spike amplitude may set the actuator element into a predetermined and controlled resonance. Most generally a signal is applied which will excite the resonance frequency of the mechanical/electrical system defined by said actuator structure.

In another embodiment according to the invention the movable element is addressed with a positive or negative potential. An amplifying signal is applied to an electrode belonging to said movable element, which will excite the resonance frequency of the mechanical/electrical system. Said signal applied to the electrode may be any undulating signal for example a sine like waveform or a saw tooth waveform.

In yet another embodiment according to the invention a first undulating signal is applied to a first electrode 112 and a second undulating signal is applied to a second electrode 114, where said first and second electrodes 112, 114 belong to the same movable element 110. The movable element 110 is addressed with a positive or negative potential. Said first and second undulating signals are arranged to cooperate with each other. In the example of applying sine like waveforms to said first and second electrodes 112, 114, said first waveform is phase shifted relative to said second waveform. Preferably said first and second waveforms are out of phase relative to each other by 180 degrees for accomplishing greatest effect. Different kinds of waveforms may be applied to the first and second electrodes and other differences in phase than 180 degrees between said first and second undulating signal may be applicable in order to accomplish greatest effect. By applying undulating signals on two electrodes belonging to the same movable element, which cooperate with each other, may effectively give twice as high attractive force compared to only applying an undulating signal on the single electrode. This is because the attractive force is alternating between said first and second electrode in cooperative fashion, which doubles the time said attractive force is making a response to said movable element. Said first and second electrode 112, 114 are arranged essentially opposite to each other, see FIG. 1, which means that the first electrode attract the movable element to deflect in one direction, which is counterclockwise, and the second electrode 114 attract the same movable element 110 to deflect in another direction, which is clockwise.

One example of the invention is a micromirror 110 with two electrodes 112, 114, where an oscillating voltage is applied to each electrode and an addressing voltage is applied to the movable element. The two electrode voltages are π radians out of phase with respect to each other. The force induced by each electrode is then:

$F \propto (V_m - V_e)^2$, where $V_e$ is the voltage applied to the electrode and $V_m$ is the voltage applied to the movable element. The voltages applied to the electrodes are:

$$\begin{cases} V_{e1} = A_1 \sin(\omega) \\ V_{e2} = A_2 \sin(\omega + \pi) = -A_2 \sin(\omega) \end{cases}$$

The force induced by electrode 1 is:

$$\begin{aligned} F_1 &\propto (V_m - A_1 \sin(\omega))^2 \\ &= V_m^2 - 2V_m A_1 \sin(\omega) + A_1^2 \sin^2(\omega) \\ &= V_m^2 - 2V_m A_1 \sin(\omega) + \frac{A_1^2}{2}(1 - \cos(2\omega)) \\ &= V_m^2 + \frac{A_1^2}{2} - 2V_m A_1 \sin(\omega) - \frac{A_1^2}{2}\cos(2\omega) \end{aligned}$$

The force induced by electrode 2 is:

$$\begin{aligned} F_2 &\propto (V_m + A_2 \sin(\omega))^2 \\ &= \cdots \\ &= V_m^2 + \frac{A_2^2}{2} + 2V_m A_2 \sin(\omega) - \frac{A_2^2}{2}\cos(2\omega) \end{aligned}$$

The resulting force acting on the movable element in the direction of force $F_1$ is then:

$$\begin{aligned} F_{res} &\propto F_1 - F_2 \\ &= \frac{1}{2}(A_1^2 - A_2^2) - 2V_m(A_1 + A_2)\sin(\omega) - \frac{1}{2}(A_1^2 - A_2^2)\cos(2\omega) \end{aligned}$$

If the voltage amplitude, A, is assumed equal on both electrodes, all contributions but the components with frequency ω will cancel, and the force that induce the movement is simply given as:

$F_{res} \propto -4V_m A \sin(\omega)$

When the element is in non-addressed state, i.e. $V_m=0$, no resulting force exist and the mirror is in its equilibrium state. However, when an addressing voltage is applied to the movable element a resulting force with frequency ω exist and the movable element starts to oscillate with increasingly higher amplitude, due to the resonance amplification. The electromagnetic radiation source may be synchronized with the oscillations and for example after a few oscillations it is triggered when the amplitude of the movement is at maximum. By this method, the amplitude of the movement can be amplified by the factor Q for a given fixed addressing voltage.

After triggering the radiation source, new addressing data cannot be loaded before the oscillation has stopped, due to varying electrode capacitance during the oscillations. Therefore, to damp the oscillations, the polarity of the addressing voltage can be changed or the phase of the oscillating voltages can be switched, producing a counter acting force that will damp the oscillations.

With the presented addressing scheme the mirror-electrode gap can be reduced. The reason is that there is a phase lag between the acting force and the resulting movement, due to inherent system damping, such as inertia. When the movement is at maximum, close to the electrode, the direction of the accelerating force is already reversed and is trying to move the movable element away from the electrode. The risk of "snap-in" is therefore reduced and consequently the gap can be reduced. Snap-in is a state when for example the movable element 110 is deflected, due to attractive forces, beyond a certain point, which will cause the movable element to snap with its outer edge to the substrate if possible and/or possibly temporarily or permanently damaging hinges attached to the movable element 110 and said support structure.

Figure 3:
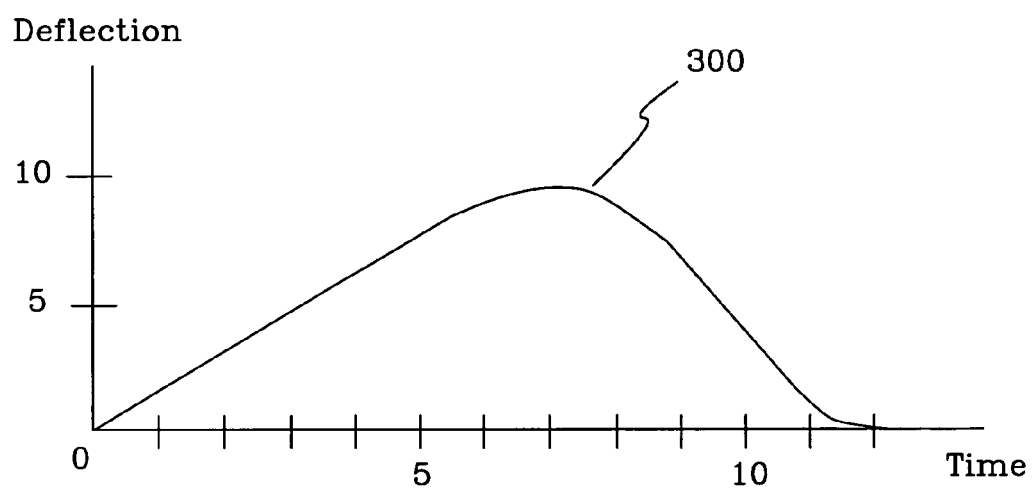
FIG. 3 is a schematic illustration of a deflection versus time curve for a movable microelement when applying a short pulse according to the invention.

In another embodiment of the present invention one electrode is addressed with a positive or negative potential and a transient pulse is applied to the movable element. Said transient pulse is short, i.e., said pulse is switched off before or essentially at the maximum deflection, thereby avoiding said movable element to snap in a maximum deflected state. FIG. 3 illustrates a deflection of a movable element versus time when applying a 2.5 volt pulse at time 0. Said pulse is switched off after 7 μs, which is assumed to be the maximum deflection without snap in for this particular actuator structure. The curve can be said to define a ballistic mechanical response. The electrode may be addressed with a potential between 0–(−5) V. The structure is a movable micromirror, where the movable element (the reflective mirror) has a rectangular shape with sides of 16 μm, thickness of 1.2 μm, density of 2.7 g/cm³ and resonance frequency of 460 kHz. The micromirror is attached to the support structure 111 by means of springs of aluminum having a length of 5 μm, a width of 0.6 μm, a thickness of 0.18 μm. After the transient pulse is switched off said movable element 110 comes to rest within 5 μs. Active damping may reduce the time it takes for said movable element to come to rest. For example, if said transient pulse has been applied to electrode 112 another damping pulse may be applied on electrode 114, or a plurality of pulses applied serially and/or in parallel to both electrodes 112, 114.

Instead of applying the short pulse on the movable element at least one of the electrodes may be applied with a transient pulse and the mirror addressed with a potential either positive or negative, thereby causing essentially the same phenomena as described in connection with FIG. 3 above. Preferably the resonance frequency for the actuator structure 100 in case of applying a short transient pulse is below 100 kHz allowing some time for reaching the desired state of deflection and also some time for synchronizing the pulse of electromagnetic radiation which is about to impinge into the movable element at said desired deflection.

Figure 5:
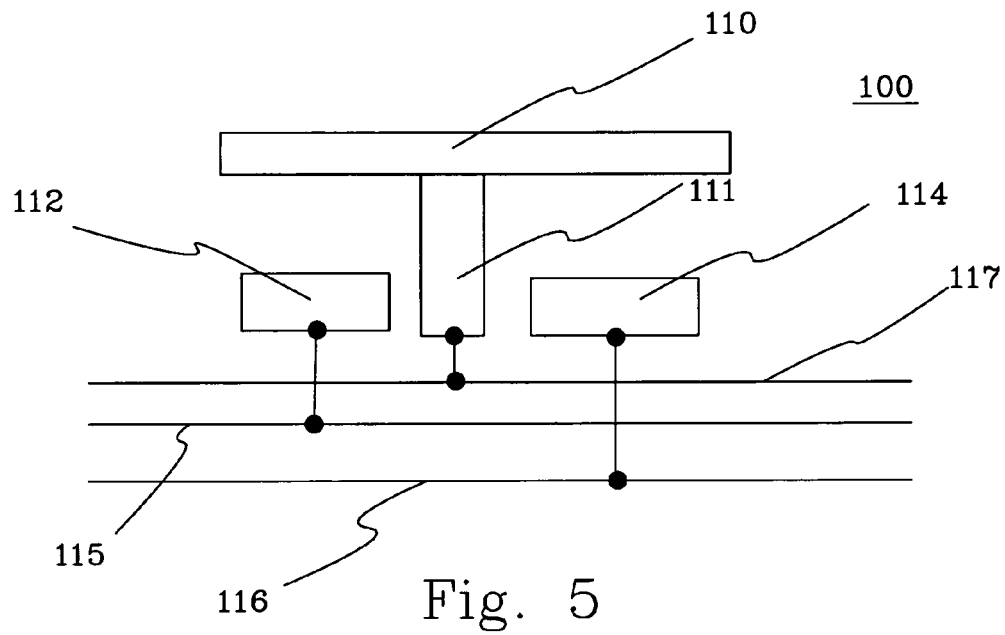
FIG. 5 illustrates a side view of wiring connecting to the mirror structure and electrodes according to prior art.

FIG. 5 illustrates a side view of a prior art wiring connecting to the actuator structure 100 comprising a movable modulator microelement 110, first electrode 112 and second electrode 114. A first conductor 117 is connected to the movable modulator microelement 110, a second conductor 115 is connected to the first electrode 112 and a third conductor 116 is connected to the second electrode 114. In an SLM every movable microstructure may be connected to each other or separated to each other, the same applies to said first and second electrodes 112, 114. There is also a possibility to only group a smaller part of movable microstructures to each other while keeping the rest of said movable modulator microelement separate to each other, the same applies to said first and second electrodes 112, 114.

Figure 6:
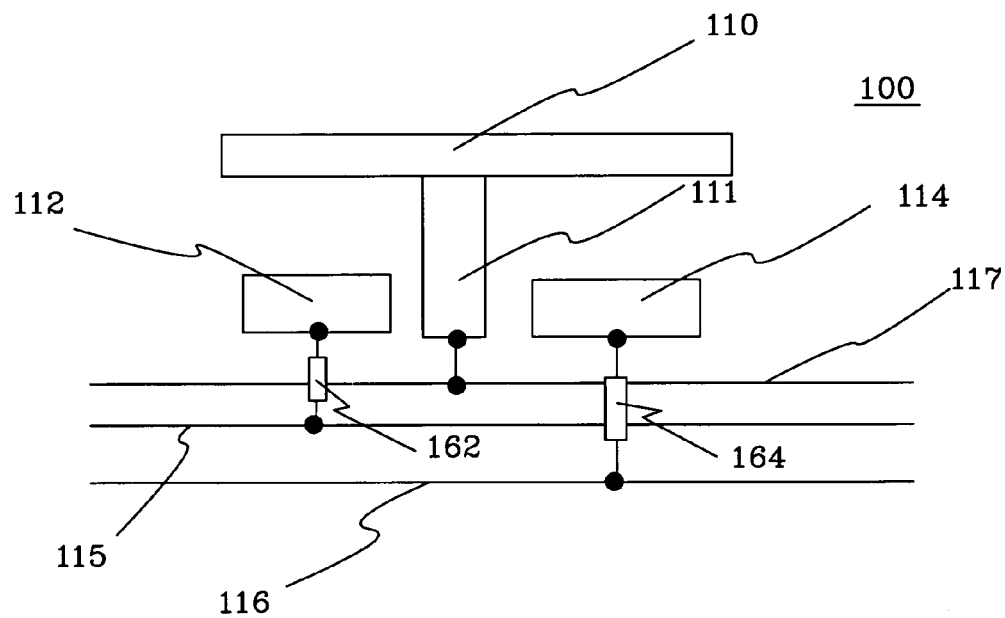
FIG. 6 illustrates a side view of wiring connecting to the mirror structure and electrodes according to an embodiment of the present invention.
Figure 7:
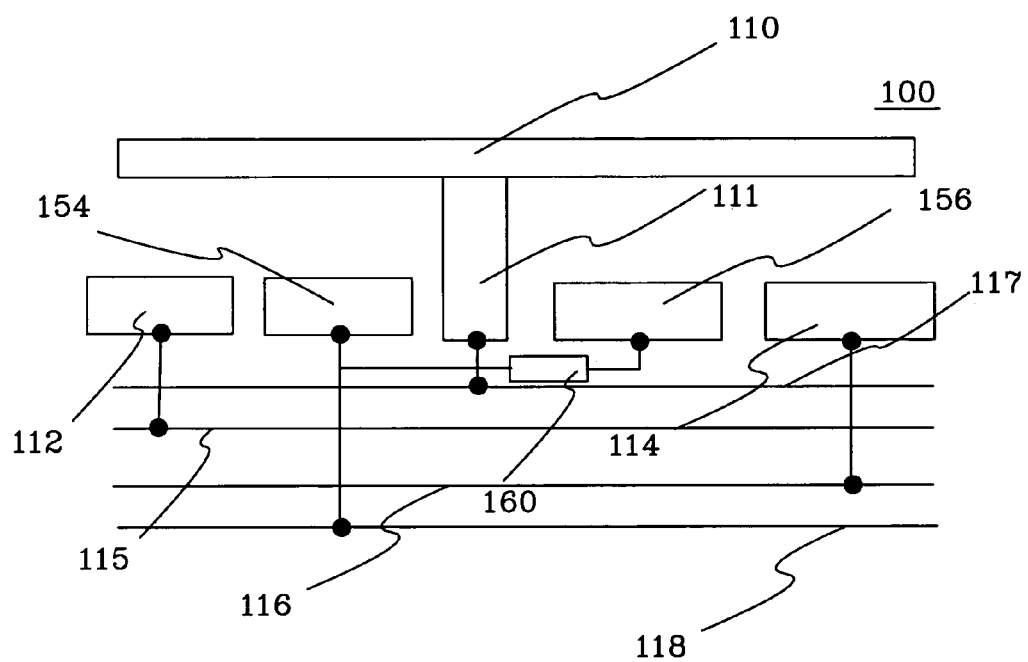
FIG. 7 illustrates a side view of wiring connecting to the mirror structure and electrodes according to another embodiment of the present invention.

FIG. 6 illustrates an inventive embodiment of connecting the electrodes to the wiring. A first resistance 162 is connected to the first electrode 112 and a second resistance 164 is connected to the second electrode 114. With a bias between the mirror and the electrode any movement will cause a current to flow through the resistors 162 and 164. The dissipated energy is taken from the kinetic energy of the mirror, for example when said mirror is oscillating. When removing the amplifying signal said movable element will come to rest quicker compared to the prior art wiring diagram because of a resistive damping. The resistance can be connectable to any of the electrodes or in separate electrodes as illustrated in FIG. 7. Here two extra electrodes 154, 156 functions as damping electrodes. Said electrodes are connectable to a conductor 118 via a resistance 160. In this embodiment depicted in FIG. 7 said damping electrodes are arranged closer the support structure 111 than electrodes 112, 114, of course the reverse is applicable or one damping electrode closer to the support structure 112 or 114 on one side and beyond said electrode 114 or 112 on the other side.

It is also possible to combine the embodiment depicted in FIG. 6 with the embodiment depicted in FIG. 7, i.e., at least one resistance connectable to at least one of electrodes 112, 114 and at least one further electrode 154, 156 connectable to at least one resistance 160.

A signal applied causing the movable element to resonate at its resonant frequency is preferably below 1 MHz for a movable element being a micromirror having a square shaped size with sides being approximately 16 μm. The time for setting the movable element in resonance, flashing the electromagnetic radiation at a desired deflection of said movable element, switching off said signal causing said resonance and a settlement to rest of said movable element should preferably be around 20–30 μs for a flash frequency of the electromagnetic radiation of 8 kHz.

In another embodiment according to the invention the amplifying signal and the address signal are applied to the same electrode 112 or 114. Said address signal and amplifying signal may be separate signals or a signal belonging to the same waveform.

When using the inventive addressing method for the actuator structure, being for example an array of microelements in an SLM, in a pattern generator said signal which will excite the resonance frequency of said microelements may be switched on a predetermined time period before a beam of electromagnetic radiation impinges onto said SLM. Said predetermined time period will allow the microelement to oscillate with determinable amplitude. By synchronizing a pulse frequency of said electromagnetic radiation source, which for instance can be a laser source with any output frequency such as 248 nm, 197 nm 156 nm, with said oscillating frequency a predetermined image on the SLM may be imaged onto an object.

In an SLM structure the number of modulating elements may sometimes be in the order of several millions. The address signal is in one embodiment of the invention unique for each modulating element with the amplifying signal (short pulse or undulating signal) equal for all elements.

In another embodiment of the present invention a second or higher resonance frequency is superimposed to said first order resonance frequency. Said first order resonance frequency will, as described above, coincide with the mechanical response resonance frequency of a deflecting action of the movable element. The second or higher orders of resonance frequency will coincide with the mechanical response causing a deflecting action within the movable element. Said second or higher orders of resonance frequency may be used to flatten out mirrors, at the exact time of a flash from a writing laser. If the mirrors for some reason are not flat, caused for example from the manufacturing process or due to mechanical stress change over time caused by the radiation from the writing laser, said second or higher orders of resonance frequency may be used to flatten out said non flat mirror. For a square shaped micro mirror with sides being 16 µm and a thickness of 480 nm and with hinges being 1.8 µm long, 0.8 µm wide and 480 nm thick a first resonance frequency will be 1.4 MHz, a second order resonance frequency will be 4.0 MHz, a third order resonance frequency will be 5.5 MHz, a fourth order resonance frequency will be 5.7 MHz, a fifth order resonance frequency will be 11.8 MHz and a sixth order resonance frequency will be 13.5 MHz. By superimposing one ore a plurality of said second or higher orders of resonance frequency to said first order resonance frequency any deformation of said movable element, which is not desirable, might be eliminated. Said resonance frequencies may be superimposed in a digital or analog fashion according to well-known methods for a man with ordinary skills in the art, and therefore needs no deeper clarifications.

Figure 8A:
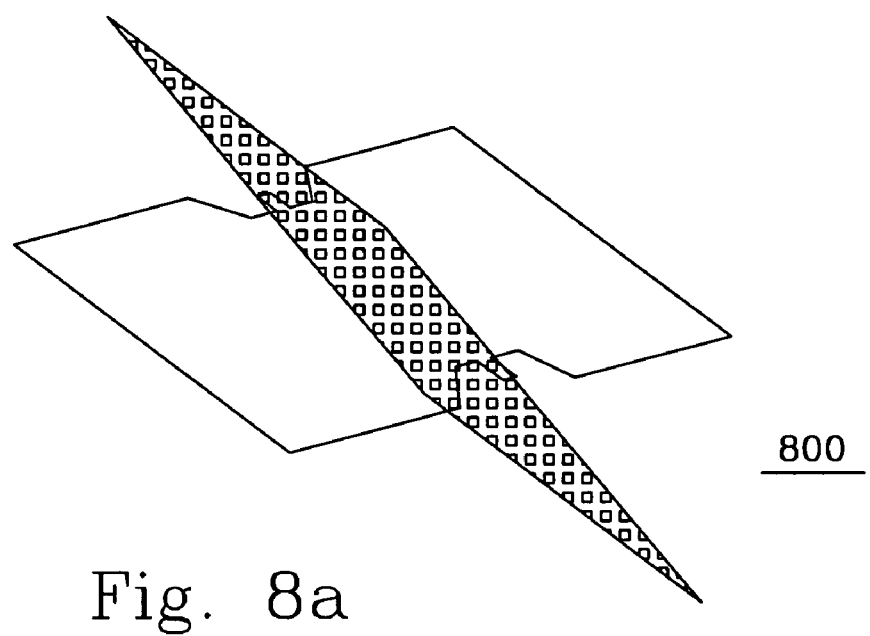
Figure 8B:
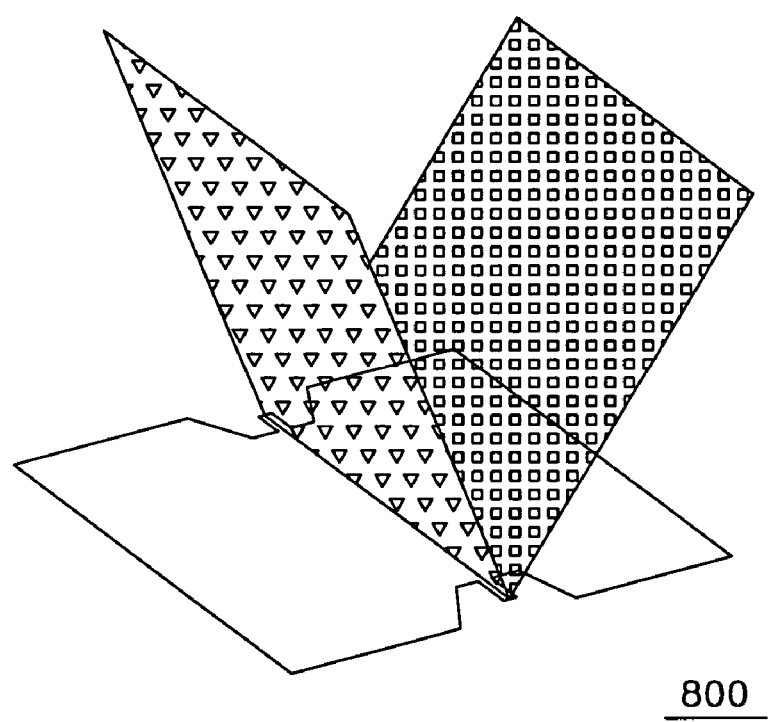

Different movable elements in a specific SLM may be shaped differently, therefore one specific movable element may have the first order resonance frequency superimposed by the second order resonance frequency while another movable element may have its first order resonance frequency superimposed by the third order resonance frequency in order to optimize the characteristics of said movable element. FIGS. 8a–8d illustrates the first, second, third and fourth resonance frequencies respectively for a specific shape of a micro mirror element. In FIG. 8a the whole movable element is tilted around the hinges. In FIG. 8b the movable element will deflect like a butterfly. In FIG. 8c said movable element will be twisted around an axis, which lies in a plane of said movable element and is perpendicular to said hinges. In FIG. 8d the movable element is a combination of a butterfly deflection and a rotation around the same axis as the same movable element is twisted around in FIG. 8c.

While the preceding examples are cast in terms of a method, devices and systems employing this method are easily understood. A magnetic memory containing a program capable of practicing the claimed method is one such device. A computer system having memory loaded with a program practicing the claimed method is another such device.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A method for modulating at least one pulse of electromagnetic radiation with a spatial light modulator, comprising the actions of:
   providing at least one mechanically movable modulator element,
   providing at least one actuating element capable to produce forces on said movable modulator element,
   providing an address signal to said at least one movable modulator element,
   providing a first amplifying signal to at least one first electrode belonging to said at least one movable modulator element,
   shaping and timing said amplifying signal for creating an oscillating mechanical response in the movable modulator element,
   synchronizing said electromagnetic radiation pulse with any amplitude value at or between a maximum amplitude value and a minimum amplitude value of said oscillating movable modulator element.

2. The method according to claim 1, wherein said amplifying signal is exciting a resonant mechanical response.

3. The method according to claim 2, wherein said resonant mechanical response is a first order resonance frequency for said movable modulator element.

4. The method according to claim 3, wherein a second or higher order resonance frequency is superimposed to said first order resonance frequency.

5. The method according to claim 1, wherein said amplifying signal is an ondulating waveform.

6. The method according to claim 1, wherein said amplifying signal is a pulse exciting a transient mechanical response.

7. The method according to claim 5, wherein said ondulating signal is sine shaped.

8. The method according to claim 2, wherein said ondulating signal is saw tooth shaped.

9. The method according to claim 6, wherein said pulse lasts shorter than the time it takes for the movable modulator element to reach its snap-in state thereby avoiding the snap-in state.

10. The method according to claim 5, wherein said ondulating signal is timed to have a maximum in the mechanical response at the time of impinging the electromagnetic signal onto the movable modulator element.

11. The method according to claim 1, further comprising the action of:
   providing an amplifying signal to at least one second electrode, cooperating with said at least one first electrode to further amplify the deflection of the movable modulator element.

12. The method according to claim 1, wherein said addressing is done in a first phase and said amplifying signal is provided in a second phase.

13. The method according to claim 1, wherein said mechanical response of said movable element is actively damped to rest after said electromagnetic radiation has impinged onto said movable modulator element.

14. The method according to claim 1, wherein said actuating element is a gap.

15. The method according to claim 1, wherein said actuating element is a dielectric medium.

16. The method according to claim 12, wherein said dielectric medium is elastic.

17. The method according to claim 1, wherein said actuating element is a piezoelectric medium.

18. The method according to claim 1, wherein said actuating element is an electrostrictive medium.

19. The method according to claim 1, wherein said movable modulator element is damped by fluid forces.

20. The method according to claim 1, wherein said movable modulator element is damped by mechanical losses in a solid material.

21. The method according to claim 1, wherein said movable modulator element is damped by resistive damping.

22. The method according to claim 1, wherein said movable modulator element is damped by magnetically induced eddy currents.

23. The method according to claim 1, wherein a signal is applied, which counteracts an induced mechanical resonance actively by damping.

24. The method according to claim 11, wherein said amplifying signals provided on said at least one first and said at least second electrodes are ondulating signals 180 degrees out of phase relative to each other.

25. The method according to claim 1, wherein said movable element is a digital element.

26. The method according to claim 1, wherein said movable modulator element is a multivalued element.

27. The method according to claim 1, wherein said movable modulator element has a tilting action.

28. The method according to claim 1, wherein said movable modulator element has a piston action.

29. The method according to claim 1, wherein said movable modulator element modulates the intensity of said electromagnetic radiation.

30. The method according to claim 1, wherein said movable modulator element modulates the phase of said electromagnetic radiation.

31. A method for modulating at least one pulse of electromagnetic radiation with a spatial light modulator (SLM), comprising the actions of:
providing at least one mechanically movable modulator element,
providing at least one actuating element capable to produce forces on said movable modulator element,
providing all address signal to at least one electrode belonging to said at least one mechanically movable modulator element,
providing an amplifying signal to said at least one movable modulator element,
shaping and timing said amplifying signal for creating an oscillating mechanical response in the movable modulator element,
synchronizing said electromagnetic radiation pulse with any amplitude value at or between a maximum amplitude value and a minimum amplitude value of said oscillating movable modulator element.

32. The method according to claim 31, wherein said amplifying signal is exciting a resonant mechanical response.

33. The method according to claim 32, wherein said resonant mechanical response is a first order resonance frequency for said movable modulator element.

34. The method according to claim 33, wherein a second or higher order resonance frequency is superimposed to said first order resonance frequency.

35. The method according to claim 31, wherein said amplifying signal is an ondulating waveform.

36. The method according to claim 31, wherein said amplifying signal is a pulse exciting a transient mechanical response.

37. The method according to claim 35, wherein said ondulating signal is sine shaped.

38. The method according to claim 35, wherein said ondulating signal is saw tooth shaped.

39. The method according to claim 36, wherein said pulse lasts shorter than the time it takes for the movable modulator element to reach its snap in state thereby avoiding said snap-in state.

40. The method according to claim 35, wherein said ondulating signal is timed to have a maximum in the mechanical response at the time of impinging the electromagnetic signal onto the movable modulator element.

41. The method according to claim 31, wherein said addressing is done in a first phase and said amplifying signal is provided in a second phase.

42. The method according to claim 35, wherein said ondulating signal is actively damped to rest after said electromagnetic radiation has impinged onto said movable modulator element.

43. The method according to claim 31, wherein said actuating element is a gap.

44. The method according to claim 31, wherein said actuating element is a dielectric medium.

45. The method according to claim 44, wherein said dielectric medium is elastic.

46. The method according to claim 31, wherein said actuating element is a piezoelectric medium.

47. The method according to claim 31, wherein said actuating element is an electrostrictive medium.

48. The method according to claim 31, wherein said movable modulator element is damped by fluid forces.

49. The method according to claim 31, wherein said movable modulator element is damped by mechanical losses in a solid material.

50. The method according to claim 31, wherein said movable modulator element is damped by resistive damping.

51. The method according to claim 31, wherein said movable modulator element is damped by magnetically induced eddy currents.

52. The method according to claim 31, wherein a signal is applied, which counteracts an induced mechanical resonance actively by damping.

53. The method according to claim 31, wherein said movable modulator element is a digital element.

54. The method according to claim 31, wherein said movable modulator element is a multivalued element.

55. The method according to claim 31, wherein said movable modulator element has a tilting action.

56. The method according to claim 31, wherein said movable modulator element has a piston action.

57. The method according to claim 31, wherein said movable modulator element modulates the intensity of said electromagnetic radiation.

58. The method according to claim 31, wherein said movable modulator element modulates the phase of said electromagnetic radiation.

59. A method for modulating at least one pulse of electromagnetic radiation with a spatial light modulator, comprising the actions of:
providing at least one mechanically movable modulator element,
providing at least one actuating element capable to produce forces on said movable modulator element,
providing a first address signal to at least one first electrode belonging to said movable modulator element,
providing a first amplifying signal to the at least one first electrode belonging to said at least one movable modulaotr element,
shaping and timing said amplifying signal for creating an oscillating mechanical response in the movable modulator element,
synchronizing said electromagnetic radiation pulse with any amplitude value at or between a maximum amplitude value and a minimum amplitude value of said oscillating movable modulator element.

60. The method according to claim 59, wherein said amplifying signal is exciting a resonant mechanical response.

61. The method according to claim 60, wherein said resonant mechanical response is a first order resonance frequency for said movable modulator element.

62. The method according to claim 61, wherein a second or higher order resonance frequency is superimposed to said first order resonance frequency.

63. The method according to claim 59, wherein said amplifying signal is an ondulating waveform.

64. The method according to claim 59, wherein said amplifying signal is a pulse exciting a transient mechanical response.

65. The method according to claim 63, wherein said ondulating signal is sine shaped.

66. The method according to claim 63, wherein said ondulating signal is saw tooth shaped.

67. The method according to claim 64, wherein said pulse lasts shorter than the time it takes for the movable element to reach its snap-in state thereby avoiding said snap-in state.

68. The method according to claim 63, wherein said ondulating signal is timed to have a maximum in the mechanical response at the time of impinging the electromagnetic signal onto the movable modulator element.

69. The method according to claim 59, further comprising the action of:
providing a second amplifying signal and a second address signal to at least one second electrode, cooperating with said at least one first electrode.

70. The method according to claim 59, wherein said addressing is done in a first phase and said amplifying signal is provided in a second phase.

71. The method according to claim 59, wherein said mechanical response of the movable element is actively damped to rest after said electromagnetic radiation has impinged onto said movable modulator element.

72. The method according to claim 59, wherein said actuating element is a gap.

73. The method according to claim 59, wherein said actuating element is a dielectric medium.

74. The method according to claim 73, wherein said dielectric medium is elastic.

75. The method according to claim 59, wherein said actuating element is a piezoelectric medium.

76. The method according to claim 59, wherein said actuating element is an electrostrictive medium.

77. The method according to claim 59, wherein said modulator element is damped by fluid forces.

78. The method according to claim 59, wherein said movable modulator element is damped by mechanical losses in a solid material.

79. The method according to claim 59, wherein said movable modulator element is damped by resistive damping.

80. The method according to claim 59, wherein said movable modulator element is damped by magnetically induced eddy currents.

81. The method according to claim 59, wherein a signal is applied, which counteracts an induced mechanical resonance actively by damping.

82. The method according to claim 69, wherein said amplifying signals provided on said at least one first and said at least one second electrodes are ondulating signals 180 degrees out of phase relative to each other.

83. The method according to claim 59, wherein said movable modulator element is a digital element.

84. The method according to claim 59, wherein said movable modulator element is a multivalued element.

85. The method according to claim 59, wherein said movable modulator element has a tilting action.

86. The method according to claim 59, wherein said movable modulator element has a piston action.

87. The method according to claim 59, wherein said movable modulator element modulates the intensity of said electromagnetic radiation.

88. The method according to claim 59, wherein said movable modulator element modulates the phase of said electromagnetic radiation.

89. The method according to claim 59, wherein said amplifying signal and said address signal belong to the same signal.

90. A method for patterning a workpiece arranged at an image plane and covered at least partly with a layer sensitive to electromagnetic radiation, by using at least one spatial light modulator (SLM) arranged at an object plane, where said SLM comprises at least one movable modulator microelement, comprising:
providing an address signal to said at least one movable modulator microelement,
oscillating said at least one movable modulator microelement by providing a first amplifying signal to at least one first electrode belonging to said at least one movable modulator microelement,
emitting electromagnetic radiation directed onto said object plane,
synchronizing said electromagnetic radiation with any amplitude value at or between a maximum amplitude value and a minimum amplitude value of said oscillating movable modulator element,
receiving said electromagnetic radiation by said spatial light modulator,
relaying by said spatial light modulator a modulated electromagnetic radiation toward said work piece.

91. The method according to claim 90, wherein said amplifying signal is exciting a resonant mechanical response.

92. The method according to claim 91, wherein said resonant mechanical response is a first order resonance frequency for said movable modulator element.

93. The method according to claim 92, wherein a second or higher order resonance frequency is superimposed to said first order resonance frequency.

94. The method according to claim 90, wherein said amplifying signal is an ondulating waveform.

95. The method according to claim 90, wherein said synchronization is performed so that said electromagnetic radiation impinges on at least one movable modulator microelement at its maximum amplitude being said desired degree of deflection.

96. The method according to claim 90, wherein said synchronization is performed so that said electromagnetic radiation impinges on at least one movable modulator microelement at a predetermined deflection state before it reaches its maximum amplitude.

97. A method for patterning a workpiece arranged at an image plane and covered at least partly with a layer sensitive to electromagnetic radiation, by using at least one spatial light modulator (SLM) arranged at an object plane, where said SLM comprises at least one movable modulator microelement, comprising:
  providing an address signal to at least one electrode belonging to said at least one movable modulator microelement,
  oscillating said at least one movable modulator microelement by providing a first amplifying signal to said at least one movable modulator microelement,
  emitting electromagnetic radiation directed onto said object plane,
  synchronizing said electromagnetic radiation pulse with any amplitude value at or between a maximum amplitude value and a minimum amplitude value of said oscillating movable modulator element,
  receiving said electromagnetic radiation by said spatial light modulator,
  relaying by said spatial light modulator a modulated electromagnetic radiation toward said work piece.

98. The method according to claim 97, wherein said amplifying signal is exciting a resonant mechanical response.

99. The method according to claim 98, wherein said resonant mechanical response is a first order resonance frequency for said movable modulator element.

100. The method according to claim 99, wherein a second or higher order resonance frequency is superimposed to said first order resonance frequency.

101. The method according to claim 97, wherein said amplifying signal is an ondulating waveform.

102. The method according to claim 97, wherein said synchronization is performed so that said electromagnetic radiation impinges on at least one movable modulators microelement at its maximum amplitude being said desired degree of deflection.

103. The method according to claim 97, wherein said synchronization is performed so that said electromagnetic radiation impinges on at least one movable modulator microelement at a predetermined deflection state before it reaches its maximum amplitude.

104. A method for patterning a workpiece arranged at an image plane and covered at least partly with a layer sensitive to electromagnetic radiation, by using at least one spatial light modulator (SLM) arranged at an object plane, where said SLM comprises at least one movable modulator microelement, comprising:
  providing an address signal to at least one electrode belonging to said at least one movable modulator microelement,
  oscillating said at least one movable modulator microelement by providing a first amplifying signal to at least one electrode belonging to said at least one movable modulator microelement,
  emitting electromagnetic radiation directed onto said object plane,
  synchronizing said electromagnetic radiation pulse with any amplitude value at or between a maximum amplitude value and a minimum amplitude value of said oscillating movable modulator element,
  receiving said electromagnetic radiation by said spatial light modulator,
  relaying by said spatial light modulator a modulated electromagnetic radiation toward said work piece.

105. The method according to claim 104, wherein said amplifying signal is exciting a resonant mechanical response.

106. The method according to claim 105, wherein said resonant mechanical response is a first order resonance frequency for said movable modulator element.

107. The method according to claim 106, wherein a second or higher order resonance frequency is superimposed to said first order resonance frequency.

108. The method according to claim 104, wherein said amplifying signal is an ondulating waveform.

109. The method according to claim 104, wherein said synchronization is performed so that said electromagnetic radiation impinges on at least one movable modulator microelement at its maximum amplitude being said desired degree of deflection.

110. The method according to claim 104, wherein said synchronization is performed so that said electromagnetic radiation impinges on at least one movable modulator microelement at a predetermined deflection state before it reaches its maximum amplitude.

111. An apparatus for patterning a workpiece arranged at an image plane and covered at least partly with a layer sensitive to electromagnetic radiation, by using at least one spatial light modulator (SLM) arranged at an object plane, where said SLM comprises at least one movable modulator microelement, comprising:
  means for providing an address signal to at least one electrode belonging to said at least one movable modulator microelement,
  means for oscillating said at least one movable modulator microelement by providing a first amplifying signal to at least one electrode belonging to said at least one movable modulator microelement,
  means for emitting electromagnetic radiation directed onto said object plane,
  means for synchronizing said electromagnetic radiation pulse with any amplitude value at or between a maximum amplitude value and a minimum amplitude value of said oscillating movable modulator element, where said electromagnetic radiation is received by said spatial light modulator and a modulated electromagnetic radiation is relayed by said spatial light modulator toward said work piece.

112. The apparatus according to claim 111, wherein said amplifying signal is exciting a resonant mechanical response.

113. The apparatus according to claim 112, wherein said resonant mechanical response is a first order resonance frequency for said movable modulator element.

114. The method according to claim 113, wherein a second or higher order resonance frequency is superimposed to said first order resonance frequency.

115. The method according to claim 111, wherein said amplifying signal is an ondulating waveform.

116. The apparatus according to claim 111, wherein said synchronization is performed so that said electromagnetic radiation impinges on at least one movable modulator microelement at its maximum amplitude being said desired degree of deflection.

117. The apparatus according to claim 111, wherein said synchronization is performed so that said electromagnetic radiation impinges on at least one movable modulator microelement at a predetermined deflection state before it reaches its maximum amplitude.

* * * * *